UNITED STATES PATENT OFFICE.

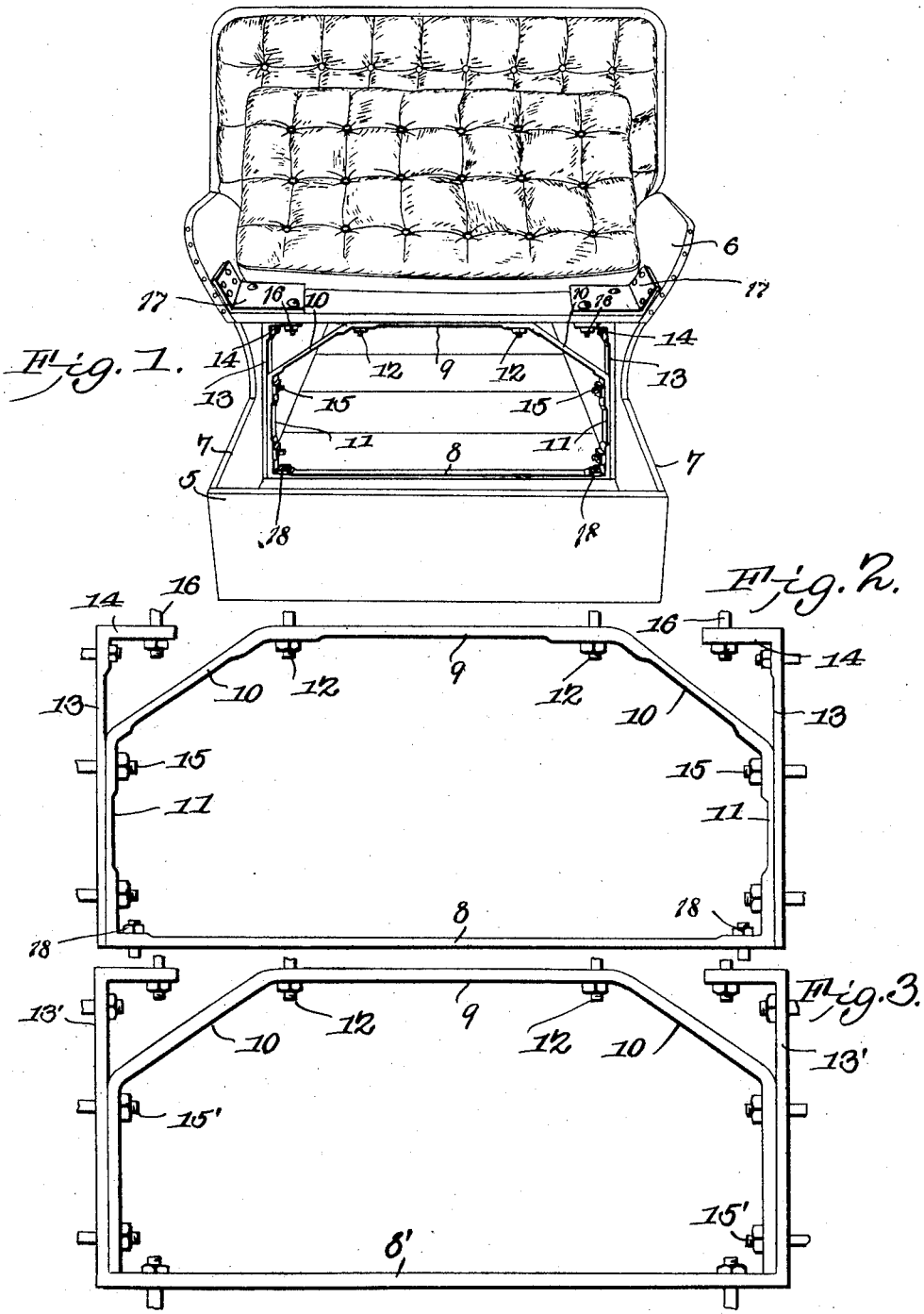

ISAAC W. COOL, OF WINNSBORO, TEXAS, ASSIGNOR OF ONE-THIRD TO JOHN W. GILBERT AND ONE-THIRD TO EMIL C. RAGSDALE, OF WINNSBORO, TEXAS.

VEHICLE-SEAT BRACE.

No. 832,776.　　　　Specification of Letters Patent.　　　　Patented Oct. 9, 1906.

Application filed March 16, 1906. Serial No. 306,439.

*To all whom it may concern:*

Be it known that I, ISAAC W. COOL, a citizen of the United States, residing at Winnsboro, in the county of Wood and State of Texas, have invented a new and useful Vehicle-Seat Brace, of which the following is a specification.

This invention relates to braces for vehicle-seats, and has for its object to provide a simple, inexpensive, and efficient device of this character adapted to sustain the weight of the seat and which also serves to reinforce and strengthen the sides and bed of the vehicle-body.

A further object of the invention is to provide a brace having one longitudinal edge thereof extended transversely across the bed of the vehicle-body and its opposite longitudinal edge attached to the seat, there being auxiliary braces interposed between the main brace and the sides of the vehicle-body for engagement with the bottom of said seat.

A still further object of the invention is to generally improve this class of devices, so as to add to their utility and durability, as well as to reduce the cost of manufacture.

With these and other objects in view the invention consists in the construction and novel combination and arrangement of parts hereinafter fully described, and illustrated in the accompanying drawings, it being understood that various changes in form, proportions, and minor details of construction may be resorted to within the scope of the appended claims.

In the accompanying drawings, forming a part of this specification, Figure 1 is a perspective view of a portion of a vehicle body and seat, showing my improved brace in position thereon. Fig. 2 is a front elevation of the brace detached. Fig. 3 is a similar view illustrating a modified form of the invention.

Similar numerals of reference indicate corresponding parts in all of the figures of the drawings.

The improved brace may be used on different styles of vehicles and by way of illustration is shown applied to a buggy of the ordinary construction, in which 5 designates the body of the vehicle, and 6 the seat, supported on the side walls 7, as shown.

The device consists of a hollow frame comprising a pair of longitudinally-disposed bars 8 and 9, the opposite ends of the bar 9 being deflected downwardly, as indicated at 10, and connectd to the bar 8 by vertical arms 11, preferably formed integral with the bar 8, as shown. The bar 8 extends transversely across the bed of the vehicle-body, while the central portion of the bar 9 engages the bottom of the seat 6, being secured to said seat by bolts or other suitable fastening devices 12. Interposed between the arms 11 and the sides of the vehicle-body are auxiliary braces 13, the free ends of which are extended laterally to form overhanging arms 14, designed for attachment to the bottom of the seat and preferably disposed in alinement with the upper surface of the bar 9. The vertical arms 11 and auxiliary braces 13 are secured to the sides of the vehicle-body by suitable bolts 15, while the lateral arms 14 are secured to the seat 6 by similar bolts 16, which pierce the seat 6 and engage the corner-braces 17 of the seat, as shown. Suitable bolts or similar fastening devices 18 also pass through the lower longitudinal bar 8 and engage the bed of the vehicle-body to assist in preventing accidental displacement of the brace. It will thus be seen that the brace not only serves to sustain the weight of the seat 6, but also serves to reinforce and strengthen said seat and retain the latter in proper shape and at the same time prevent spreading of the side walls of the vehicle-body.

In Fig. 3 of the drawings there is illustrated a modified form of the invention in which the auxiliary braces 13' are formed integral with the lower longitudinal bar 8', while the upper longitudinal bar 9' is formed separate and attached to the auxiliary braces 13' by means of bolts 15', which serve to secure the brace to the sides of the vehicle-body.

From the foregoing description it will be seen that there is provided a strong durable brace admirably adapted for the attainment of the ends in view.

Having thus described the invention, what is claimed is—

1. The combination with a vehicle body and seat, of a brace extending transversely across the bed of the vehicle-body and secured to the bottom of the seat, and auxiliary braces interposed between the main brace and the sides of the vehicle-body for attachment to said seat.

2. The combination with a vehicle body and seat, of a brace comprising a hollow frame having one end thereof extending transversely across the vehicle-body for attachment to the bed thereof, and its opposite end secured to the bottom of the seat, and auxiliary braces carried by the frame and engaging the sides of the vehicle-body, said auxiliary braces being provided with angular extensions adapted to engage the bottom of the seat.

3. A brace for vehicle-seats comprising a hollow frame, formed of spaced longitudinally-disposed bars, the opposite ends of one of which are deflected downwardly and connected to the adjacent bar by vertical arms.

4. A brace for vehicle-seats comprising a hollow frame formed of spaced longitudinally-disposed bars, the opposite ends of one of which are deflected downwardly and connected to the adjacent longitudinal bar by vertical arms, and auxiliary braces secured to the vertical arms and having their free ends extended laterally over the deflected portions of the longitudinal bar for attachment to the bottom of the seat.

5. A brace for vehicle-seats, comprising a hollow frame formed of spaced longitudinally-disposed bars the opposite ends of one of which are deflected downwardly and connected to the adjacent longitudinal bar by vertical arms, and lateral extensions forming a part of the frame and disposed in alinement with the upper longitudinal bar.

6. The combination with a vehicle body and seat, of a hollow frame, having one end thereof extending transversely across the vehicle-body for attachment to the bed thereof and its opposite end secured to the bottom of the seat, auxiliary braces interposed between the sides of the frame and the vehicle-body, and having their free ends deflected laterally for attachment to the seat, and fastening devices passing through the frame and auxiliary braces and engaging the sides of the vehicle-body.

In testimony that I claim the foregoing as my own I have hereto affixed my signature in the presence of two witnesses.

ISAAC W. COOL.

Witnesses:
 J. M. LANKFORD,
 M. D. CAVLOCK.